3,344,687
AXLE SUBASSEMBLY
Thomas R. Stockton, Northville, Mich., assignor to Ford Motor Company, Dearborn, Mich., a corporation of Delaware
Filed Oct. 22, 1965, Ser. No. 501,862
12 Claims. (Cl. 74—710)

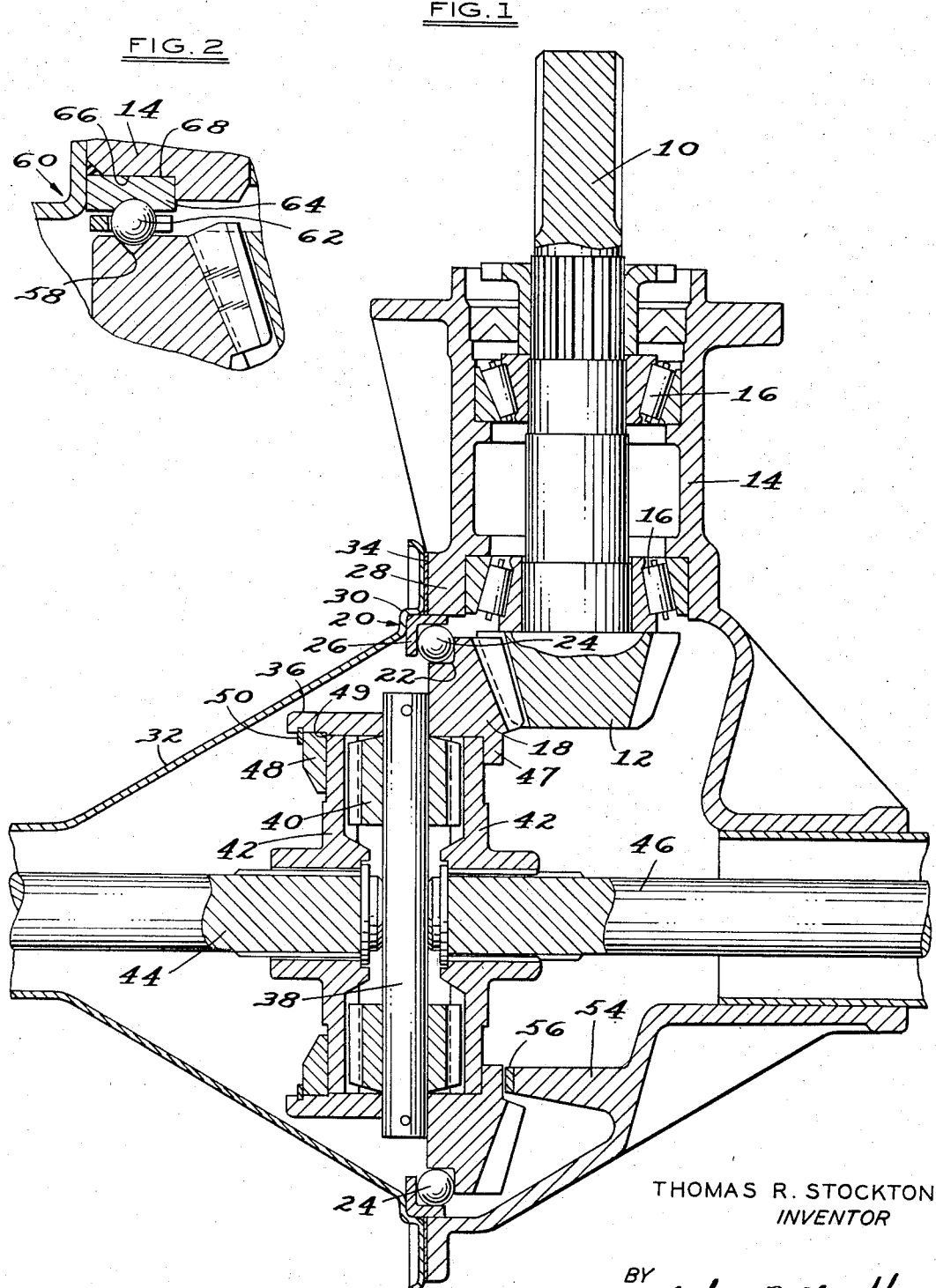

This invention relates to an axle for a motor vehicle. More particularly, it relates to that portion of a power driven axle assembly including a reduction drive gearset and differential gearing.

One of the primary objects of the invention is to provide a driven axle assembly that is economical to manufacture, lightweight in construction, and has good rigidity.

Another object of the invention is to provide a driven axle assembly in which the conventional differenial case is eliminated.

A further object of the invention is to provide an axle assembly in which the differential gearing is mounted within the ring gear of the reduction drive gearset, and includes side and pinion spur gears with essentially straight face splines that simplify assembly and disassembly and relieve the differential gearing of side thrust forces.

A still further object of the invention is to provide a rear axle assembly in which the conventional differential case is eliminated and the reduction drive gearset ring gear is floatingly located with respect to the pinion gear housing in such a manner that the ring gear is held in position by a single ball bearing unit surrounding and bearing against the outer portion of the ring gear.

A still further object of the invention is to provide a rear axle assembly in which the reduction drive unit ring gear is axially and radially located by a single annular ball bearing unit located adjacent the radially outer portion of the ring gear in a manner such that the side and radial force vector components from the ring gear loading act well inside the circular group of the bearing balls to hold the ring gear in position, and, in one embodiment, the balls contact each race at points substantially parallel to the two principal center lines of the axle assembly.

Other objects, features and advantages of the invention will become apparent upon reference to the succeeding, detailed description thereof, and to the drawings illustrating the preferred embodiments thereof; wherein, FIGURE 1 is a cross-sectional plan view of a portion of an axle assembly embodying the invention; and FIGURE 2 is a cross-sectional view of a modification of a detail of the FIGURE 1 showing.

FIGURE 1 shows the driving axle assembly for a motor vehicle, less the driving wheels, hubs and brakes. The assembly includes a power input pinion shaft 10 on which is mounted a conventional bevel drive pinion gear 12. The normal practice is to connect input shaft 10 by a universal joint to the vehicle propeller shaft joined to the vehicle transmission output shaft, the final reduction drive ratio being provided by the hypoid or spiral bevel gearset.

Pinion shaft 10, in this case, is rotatably mounted in a cylindrical housing 14 on two axially spaced rows of tapered roller bearings 16. Suitable seals and a dust cover (not shown) would be provided to prevent the escape of lubricating fluid along the shaft, and to prevent entry of dirt or other foregin matter into the reduction drive gearset and differential.

Pinion gear 12 meshes at all times with the teeth of a ring bevel gear 18 at the axially inner edge thereof. The axially outer edge of the ring gear is rotatably supported upon housing 14 by a single annular ball bearing unit 20 that is concentrically located with respect to the axis of rotation of ring gear 18. The ring gear is provided with a substantially right-angled annular notch 22 at its outer edge that is substantially V-shaped in cross section, as shown, and constitutes the inner race for bearing unit 20. The bearing unit includes a plurality of balls 24 circumferentially spaced by a cage (not shown), and frictionally engaging a substantially right-angled or channel-shaped annular outer race 26. The outer race is located radially against the undersurface of a boss 28 on housing 14, and is located both radially and axially in one direction against an annular bead 30 formed in a thin-shelled extension 32 of housing 14. The extension may be secured to housing 14 in any suitable manner, and includes provisions for the insertion of shims 34 between the housing portions to correctly locate bearing unit 20.

The construction described provides substantially a four-point contact of balls 24 with the ring gear and housing races and along center lines that are essentially at right angles to each other and substantially parallel to the axis and radial thrust components acting on the ring gear as it is driven by pinion gear 12. It will thus be seen that with this construction, the thrust components act well inside the circular grouping of the bearing balls, and therefore, the reaction forces from the housing maintain the ring gear in position.

Ring gear 18 is formed with an axial annular extension 36 through which is inserted and secured a planet pinion gear shaft 38. Rotatably journaled on shaft 38 are two spur pinion gears 40 having substantially straight face splines meshing on opposite sides with the mating straight face splines of a pair of side spur gears 42. The side gears are located axially in one direction against an annular flange 44 on one side of ring gear 18 and a stop plate or disc 46 on the opposite side, the disc 46 being held against a shoulder 48 by a snap ring 50. The side gears 42 are internally splined to separate axle shafts 44 and 46 that are axially aligned and extend in opposite directions, as shown, to the motor vehicle driving wheels (not shown).

The pinion housing 14 also supports the ring gear 18 against cocking or tilting due to side thrust loads on the axle shaft 44 during a right-hand turn, for example, if the drive load on the ring gear 18 is zero. As shown, housing 14 has an axial extension 54. A select washer 56 is inserted between extension 54 and ring gear flange 44 so that if axle shaft 44 should tend to move inwardly or towards shaft 46 when the vehicle is making a right turn, for example, a counterclockwise rotation of the ring gear about the transverse center line of the gear will be prevented by engagement of flange 44 against the housing extension 54. The washer would be selected to be of a size to permit whatever tolerance is desired. The ring gear 18 is thus maintained in the position shown at all times by the bearing unit 20 and housing extension 54.

The rear axle subassembly described operates in a known manner. The drive of pinion shaft 10 by the conventional motor vehicle propeller shaft rotates ring gear 18 at, say, a 3:1 gear reduction, for example, to rotate pinion shaft 38 and cause pinion gears 40 to move therewith. If the loads on the two axle shafts 44 and 46 are equal, the torque applied to ring gear 18 will be distributed equally to both axle shafts, and the entire differential gearset will, therefore, rotate as a unit without relative rotation between pinion gear 40 and side gears 42.

Faster rotation of one axle shaft relative to the other, such as during cornering, is accommodated by the planetating action of carrier 36 in a known manner.

As described previously, with the single row of ball bearings located substantially diagonally outwardly from the axially outer peripheral edge portion of ring gear 18, the side and radial thrust loads act well within the circular grouping of the bearing balls, and thus the reaction forces of the housing maintain the ring gear in position against pinion gear 12. Also, with the simplified spur gear face spline mesh between the pinion and side gears 40 and 42, there are no side thrusts acting on the pinion gears.

FIGURE 2 shows a slightly modified bearing unit for supporting and locating ring gear 18. In this instance, the outer peripheral surface of the ring gear is provided with an annular V-shaped groove 58 that constitutes the inner race of the annular ball bearing unit 60. The unit again has circumferentially spaced balls 62 having essentially a four-point contact with inner race 58 and an outer substantially V-shaped race 64. The balls in this instance contact the races along center lines that are substantially at right angles to each other, and are diagonally disposed with respect to the direction of application of the thrust force vector components acting on ring gear 18. The outer race 64 is contained in a grooved portion 66 of the pinion shaft housing 14 in which at least the left-hand shoulder portion 68 of the recess, as seen in the figure, is spaced substantially diagonally outwardly of the outer peripheral edge of ring gear 18. With this construction, the ring gear is located radially and in both axial directions by the bearing unit, and therefore, the housing extension 54 shown in FIGURE 1 to prevent tilting of the ring gear is unnecessary, and may be omitted, if desired.

The operation of the bearing unit shown in FIGURE 2 is substantially the same as that shown in FIGURE 1, and therefore, will not be repeated. Suffice it to say that the side and radial thrust force components acting on ring gear 18 load the ring gear into engagement with the bearing balls to maintain it in position at all times.

From the foregoing, it will be seen that the invention provides a rear axle assembly that is economical to manufacture due to the method of locating the ring gear and differential; also, the use of straight spur gears permits the gear teeth to be extruded or rolled instead of cut; the spur gears result in zero side thrust loads on the pinion, so that the location and finish of the pinion thrust faces are, therefore, not critical. Also, larger diameter and narrow width spur gears can be used. Furthermore, the support of the ring gear by only a single row of bearings reduces the cost.

While the invention has been illustrated in its preferred embodiments in the figures, it will be clear to those skilled in the arts to which the invention pertains that many changes and modifications may be made thereto without departing from the scope of the invention.

I claim:

1. An axle subassembly having a power input shaft and a pinion bevel gear integral therewith and including, a ring bevel gear meshing with said pinion gear, a housing rotatably supporting said input shaft, a pair of axially aligned power output shafts, differential gearing supported rotatably within and by said ring gear for driving said output shafts, and means for locating and supporting said ring gear with respect to said housing against radial and axial thrust loads comprising a single annular bearing means concentrically mounted with respect to said ring gear and having a portion engaging a radially outer portion of said ring gear and another portion engaging at least a portion of said housing spaced substantially diagonally outwardly from the engagement with said ring gear.

2. An axle subassembly as in claim 1, wherein said gearing includes a pinion shaft secured for rotation with said ring gear and rotatably supporting pinion spur gears thereon, and a pair of axially spaced side spur gears secured to said output shafts and meshing with said pinion gears.

3. An axle subassembly as in claim 2, wherein said pinion and side spur gears have essentially straight face splines.

4. An axle subassembly having a power input shaft and a pinion bevel gear integral therewith and including, a ring bevel gear meshing with said pinion gear, a housing rotatably supporting said input shaft, a pair of axially aligned power output shafts, differential gearing supported rotatably within and by said ring gear for driving said output shafts, and means for locating and supporting said ring gear with respect to said housing against radial and axial thrust loads, said means comprising a single annular bearing means concentrically mounted with respect to said ring gear between the outer radial surface of said ring gear and a radially spaced portion of said housing.

5. An axle subassembly as in claim 4, wherein said bearing means includes inner and outer races, said ring gear surface having an annular recess therein defining said inner race.

6. An axle subassembly as in claim 5, wherein said bearing means includes ball means separating said races, and said ring gear recess is substantially V-shaped in cross section to provide essentially a pair of points of contact with said ball means.

7. An axle subassembly as in claim 5, wherein said housing has axial and radial recess portions locating said outer race, at least one of said recess portions being disposed substantially diagonally outwardly from the axially outer edge of said ring gear opposite to an edge meshing with said pinion bevel gear.

8. An axle subassembly as in claim 7, wherein said bearing means includes ball means between said races, and said outer and inner races each have a recess substantially V-shaped in cross section to provide essentially a pair of points of contact of each with said ball means.

9. An axle subassembly having a power input shaft and a pinion bevel gear integral therewith including, a ring bevel gear meshing at an axially inner edge with said pinion gear, a housing rotatably supporting said input shaft, a pair of axially aligned power output shafts, differential gearing supported rotatably within and by said ring gear for driving said output shafts, and means for locating and supporting said ring gear with respect to said housing against radial and axial thrust loads, said means comprising a single annular bearing means concentrically mounted with respect to said ring gear between the axially outer radial edge of said ring gear and a portion of said housing spaced substantially diagonally outwardly of the said outer edge.

10. An axle subassembly as in claim 9, wherein said bearing means includes a ball bearing unit having inner and outer races each substantially V-shaped in cross section to provide essentially a four-point contact with said balls.

11. An axle subassembly as in claim 10, in which the ring gear outer edge surface has an annular recess constituting said inner race.

12. An axle subassembly as in claim 10, wherein said means for locating said ring gear includes an axially extending portion of said housing extending into substantially contiguous relation to a portion of said ring gear.

References Cited

UNITED STATES PATENTS

| Re. 12,966 | 6/1909 | Mooers | 74—714 |
| 805,567 | 11/1905 | Lindsay. | |
| 1,128,429 | 2/1915 | Fetzer. | |
| 1,657,510 | 1/1928 | Leipert | 74—713 |
| 2,133,112 | 10/1938 | Ormsby. | |
| 2,203,292 | 6/1940 | Best. | |
| 2,270,567 | 1/1942 | Slider | 74—714 |

DONLEY J. STOCKING, *Primary Examiner.*

T. C. PERRY, *Assistant Examiner.*